United States Patent
Ito et al.

(10) Patent No.: US 7,424,215 B2
(45) Date of Patent: Sep. 9, 2008

(54) LENS DEVICE AND IMAGING DEVICE USING THE SAME

(75) Inventors: Yoshihiro Ito, Saitama (JP); Yoji Naka, Saitama (JP); Takehiko Senba, Saitama (JP); Mitsuo Manabe, Saitama (JP); Yukio Noguchi, Saitama (JP)

(73) Assignees: FUJINON CORPORATION, Saitama (JP); FUJIFILM Corporation, Tokyo (JP)

( * ) Notice: Subject to any disclaimer, the term of this patent is extended or adjusted under 35 U.S.C. 154(b) by 387 days.

(21) Appl. No.: 11/231,852

(22) Filed: Sep. 22, 2005

(65) Prior Publication Data

US 2006/0062560 A1    Mar. 23, 2006

(30) Foreign Application Priority Data

Sep. 22, 2004 (JP) ............... 2004-274893
Feb. 24, 2005 (JP) ............... 2005-049531

(51) Int. Cl.
*G03B 17/00* (2006.01)
(52) U.S. Cl. ............................ 396/79; 396/75
(58) Field of Classification Search .............. 396/72, 396/73, 75, 79, 80, 87
See application file for complete search history.

(56) References Cited

U.S. PATENT DOCUMENTS

| 5,134,334 A | 7/1992 | Onishi et al. |
| 5,225,941 A | 7/1993 | Saito et al. |
| 5,317,351 A * | 5/1994 | Takahara et al. ............. 396/81 |
| 5,589,723 A | 12/1996 | Yoshida et al. |
| 5,726,521 A | 3/1998 | Kon et al. |
| 6,392,827 B1 * | 5/2002 | Ueyama et al. ............. 359/824 |

FOREIGN PATENT DOCUMENTS

| JP | 4-69070 A | 3/1992 |
| JP | 2003-315658 A | 11/2003 |

* cited by examiner

*Primary Examiner*—Rodney E Fuller
(74) *Attorney, Agent, or Firm*—Sughrue Mion, PLLC

(57) ABSTRACT

A lens frame holding a taking lens is movably connected to a driving shaft via a connector. A guide member is disposed at a lower portion of the lens frame so as to separate from the connector by about 180 degrees around an optical axis. The guide member is movably attached to a guide rod. A light emitter is disposed on a lateral side of the lens frame so as to separate from the connector by about 90 degrees around the optical axis. The light emitter applies the light to a light receiver of a line sensor confronting the light emitter. The line sensor sends a light-reception signal, which is outputted from the light receiver, to a lens-position controller. Positional information of the taking lens is obtained on the basis of the light-reception signal so that a position of the taking lens is accurately detected.

15 Claims, 13 Drawing Sheets

LENS DEVICE AND IMAGING DEVICE USING THE SAME

BACKGROUND OF THE INVENTION

1. Field of the Invention

The present invention relates to a lens device suitable for an electronic camera and a photographic camera of a portable type, and further relates to an imaging device using this lens device.

2. Description of the Related Art

Size and weight of portable cameras have been reduced. In particular, as to electronic cameras incorporated into a cellphone and a PDA (Personal Digital Assistant), taking lenses and image sensors of a CCD type and a MOS type are downsized. In virtue of this, a size of the electronic camera itself has been rapidly reduced. Some of the downsized electronic cameras have an automatic focus function for automatically performing focus adjustment by moving the taking lens in an optical-axis direction. In Japanese Patent Laid-Open Publication No. 4-69070, it is described that a driving device for moving the taking lens in the optical-axis direction utilizes a piezoelectric device to reduce size and weight of the electronic camera.

When the automatic focus function performs the focus adjustment, it is important to accurately detect a position of the taking lens. Therefore, a camera described in Japanese Patent Laid-Open Publication No. 2003-315658, for instance, comprises a ball screw, a reflector plate and a line sensor. The ball screw is fitted to an upper end of a lens frame holding the taking lens. The reflector plate is disposed at a lower end of the lens frame. The line sensor confronts the reflector plate and is disposed in an optical-axis direction. Light emitted from a light-emitting portion of the line sensor is reflected by the reflector plate. The reflected light is received by a light-receiving portion of the line sensor to detect the position of the taking lens. Meanwhile, a rod-shaped guide member is disposed in the optical-axis direction. The guide member guides the movement of the lens frame when the lens frame is moved in the optical-axis direction.

However, such as described in the above-noted Publication No. 2003-315658, the lens frame sometimes inclines due to friction, which is caused by slide movement of the guide member and the lens frame, when moved in the optical-axis direction. At this time, in the case that the reflector plate is disposed at the lower end of the lens frame such as described in the Publication No. 2003-315658, a reflecting surface of the reflector plate also inclines in association with the inclination of the lens frame. Consequently, when the light from the light-emitting portion is reflected by the reflector plate, a reflected-light receiving position of the line sensor is shifted. Thus, there arises a problem in that it is impossible to accurately detect the position of the taking lens. Further, when the light-emitting portion of the line sensor emits the light toward the lens, excess light uninvolved in image formation reaches an imaging surface, and it is caused that image contrast is lowered and a flare occurs to muddy colors of a color picture.

SUMMARY OF THE INVENTION

In view of the foregoing, it is a primary object of the present invention to provide a lens device in which a lens position is accurately detected.

It is a second object of the present invention to provide an imaging device using the above-mentioned lens device.

In order to achieve the above and other objects, the lens device according to the present invention comprises a lens frame, a shaft member, a driving device, a connector, a guide member, first and second detection members and a lens-position controller. The lens frame holds a lens. The shaft member is disposed in parallel to an optical axis of the lens. The driving device applies a driving force to the shaft member to move the lens frame in an optical-axis direction. The connector connects the shaft member and the lens frame to transmit the driving force to the lens frame. The guide member is disposed in parallel to the optical axis to guide the movement of the lens frame in the optical-axis direction. The first detection member is disposed at a lateral side of the lens frame so as to separate from the connector by a substantially right angle around the optical axis. The second detection member confronts the first detection member and is disposed in the optical-axis direction. One of the first and second detection members detects the other thereof. The lens-position controller obtains positional information of the lens on the basis of a detection signal outputted by detecting one of the first and second detection members with the other thereof.

In a preferred embodiment, before moving the lens frame to a target position, the lens-position controller judges whether or not the obtained positional information of the lens corresponds to a preset original position of the lens. When the lens-position controller judges that the obtained positional information of the lens does not correspond to the original position, it is preferable to move the lens frame to the target position after moving the lens frame to the original position.

Moreover, it is preferable that the driving device is a piezoelectric device to be expanded and contracted by applying drive pulses thereto. One end of the shaft member is fixed to the piezoelectric device. The shaft member reciprocates in the optical-axis direction in association with the expansion and the contraction of the piezoelectric device. The connector is frictionally joined to the shaft member. By making velocities for expanding and contracting the piezoelectric device different in accordance with the drive pulses to be applied thereto, the lens frame is moved in the optical-axis direction by virtue of two states, in one of which the connector moves together with the shaft member due to the frictional joint of them, and in the other of which the connector overcomes the frictional joint and is substantially prevented from moving.

In a preferred embodiment, the first detection member is a light source disposed at the lateral side of the lens frame, and the second detection member is a line sensor disposed in the optical-axis direction. It is preferable to condense the light, which is emitted from the light source, relative to the line sensor confronting the light source.

In another embodiment, the first detection member is a photoelectronic sensor of either of a transmission type and a reflection type. The photoelectronic sensor is disposed at the lateral side of the lens frame and includes a light emitter and a light receiver. In this embodiment, the second detection member is an encode plate disposed in the optical-axis direction and having slits formed in the optical-axis direction at predetermined intervals. The lens-position controller obtains the positional information of the lens on the basis of a detection signal, which is outputted at a time when the light receiver has received the light from the light emitter, and a drive signal for actuating the driving device.

In the other embodiment, the first detection member is a magnetic sensor disposed at the lateral side of the lens frame, and the second detection member is a magnetic material disposed in the optical-axis direction and having intensity distribution of magnetic fields continuously changing in the optical axis direction.

In the other embodiment, the first detection member is a conductive slider disposed at the lateral side of the lens frame, and the second detection member is a substrate disposed in the optical-axis direction and having a conductive pattern on which the slider slides. The slider is constituted by an urging member and abuts on the conductive pattern. Thus, the lens frame is pressed against the guide member by an urging force of the slider.

The imaging device according to the present invention comprises the above-mentioned lens device and a solid-state image sensor, which converts a subject image taken by the lens device into an image signal and outputs the converted image signal.

According to the present invention, it is possible to accurately detect the position of the lens. Moreover, it is possible to take a good image without causing a flare and a ghost image. Further, it is possible to accurately perform focus adjustment. In the case that the piezoelectric device is utilized as the driving device, it is possible to downsize the lens device in comparison with another case in that any of a stepping motor, a DC motor and so forth is used.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
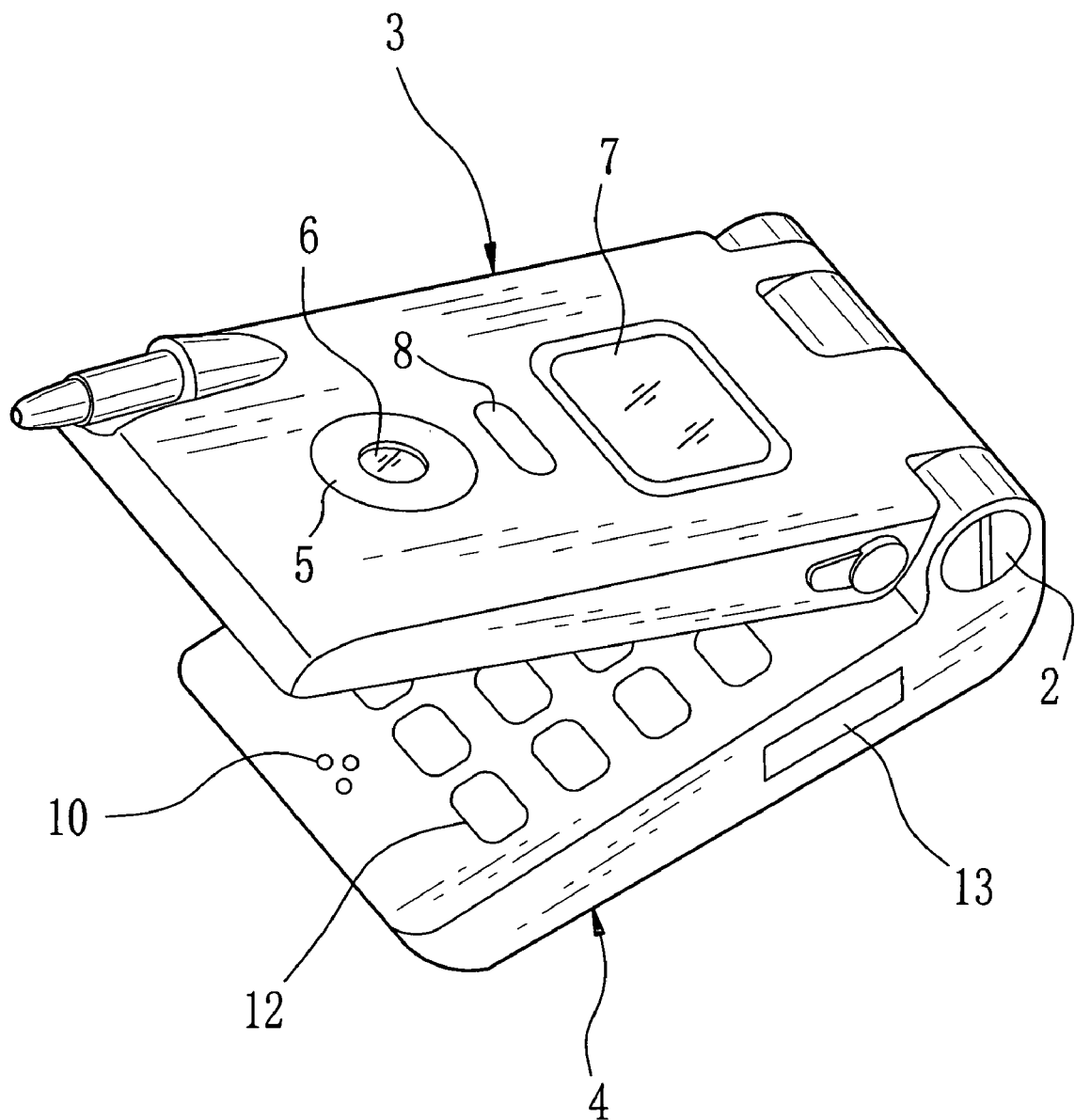
FIG. 1 is a perspective view of a camera-equipped cellphone comprising a lens device according to the present invention.

FIG. 1 shows an appearance of a camera-equipped cellphone comprising a receiver unit 3 and a transmitter unit 4, which are joined by a hinge 2 in a foldable manner. The receiver unit 3 has a built-in camera unit 5 being as an imaging device. A taking lens 6 is exposed on the receiver unit 3. The external surface of the receiver unit 3 is further provided with a liquid-crystal display (LCD) panel 7 and a flash window 8 for radiating supplemental illumination at a time when a dark subject is taken.

An internal side of the transmitter unit 4 is provided with a microphone 10 and an operating portion 12 including dial buttons, various setting buttons and a shutter button. The dial button is used for a dial operation at a time of phone call. The shutter button is handled at a shooting time. When a memory card 13 is loaded into a lateral side of the transmitter unit 4, image data taken by the camera unit 5 and saved in an embedded memory can be transferred to the memory card 13 and saved therein.

The camera unit 5 comprises a lens device 15. A structure of the lens device 15 is described below with FIGS. 2 to 4. The lens device 15 includes the taking lens 6, a lens frame 20, a driving shaft 21 being as a shaft member, a piezoelectric device 22 being as a driving device, a line sensor 23 being as a detector, and a guide rod 24.

The taking lens 6 is constituted of first to third lenses 25 to 27, which are arranged in this order from an incident side of a subject light and are integrally held by the lens frame 20. A connecter 28, a guide portion 29 and a light emitter 30 are formed on a circumferential surface of the lens frame 20 so as to respectively protrude.

Figure 4:
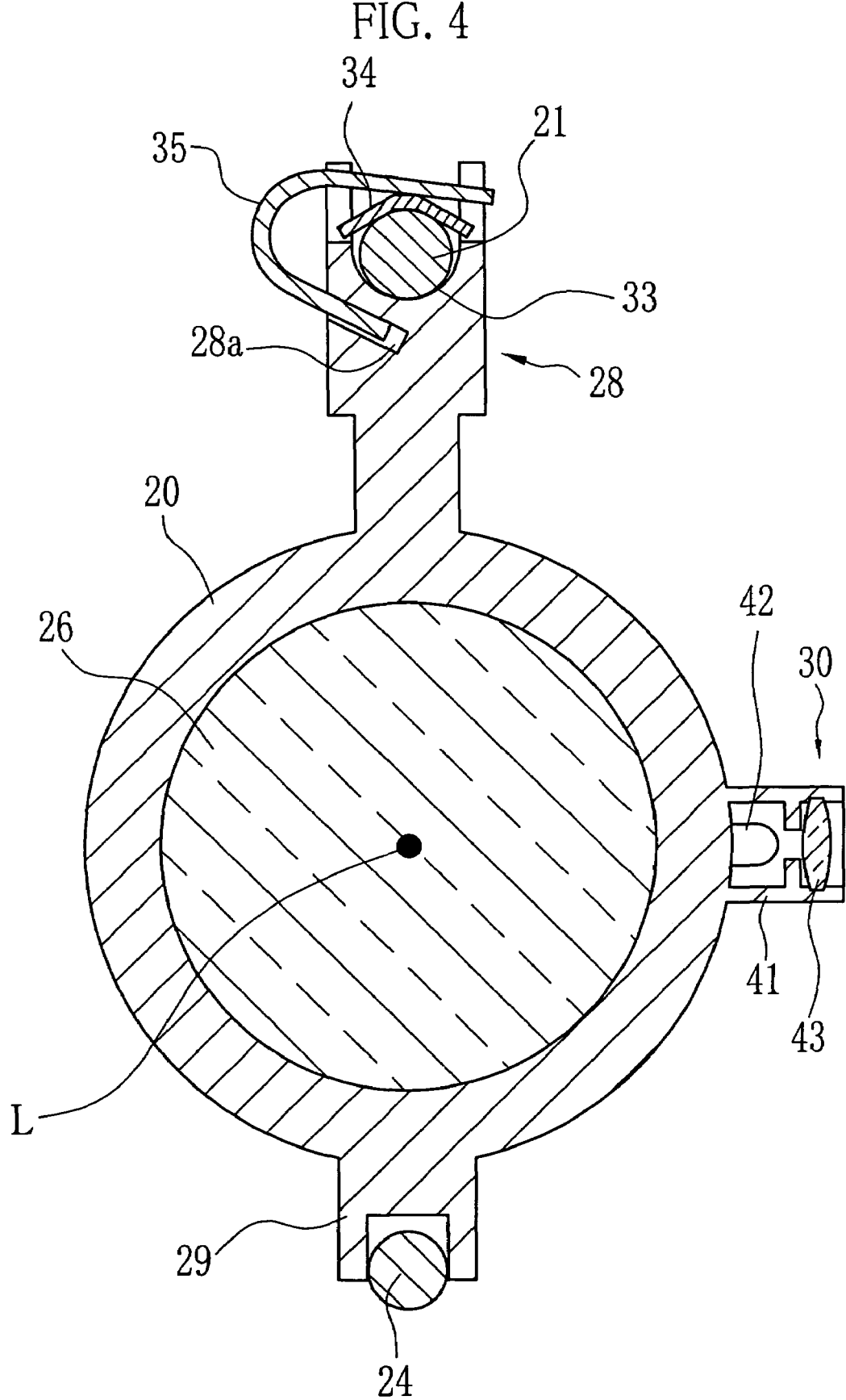
FIG. 4 is a section view showing a structure of the lens frame.

As shown in FIG. 4, the connector 28 is disposed at an upper portion of the lens frame 20. The connector 28 is provided with a concave 33 to which the driving shaft 21 is fitted, a V-shaped clasp 34 and a U-shaped leaf spring 35. The driving shaft 21 disposed in a direction of an optical axis L is fitted to the concave 33. The V-shaped clasp 34 abuts on an upper portion of the driving shaft 21. The leaf spring 35 is disposed above the V-shaped clasp 34 so as to insert one end thereof into a cutout 28a, which is formed in the connector 28, and so as to open the other end thereof. Thus, both ends of the leaf spring 35 are urged in a direction approaching to each other so that the V-shaped clasp 34 presses the driving shaft 21 against the concave 33 with appropriate force. The lens frame 20 is movably connected by the connector 28 along the driving shaft 21.

The guide portion 29 is disposed at a lower portion of the lens frame 20 so as to separate from the connector 28 by about 180 degrees in a rotational direction around the optical axis L. The guide portion 29 is movably fitted to the guide rod 24, which is disposed in parallel to the optical axis L, to guide the lens frame 20 at a time when the lens frame 20 is moved in the direction of the optical axis L. Incidentally, both ends of the guide rod 24 are fixed to a casing of the camera unit 5, although not shown in the drawing.

The light emitter 30 is disposed at a lateral side of the lens frame 20 so as to separate from the connector 28 by about 90 degrees in a clockwise direction around the optical axis L, viewing in the incident direction of the subject light. In other words, the light emitter 30 is disposed at the substantially same level with the optical axis L of the taking lens 6 held by the lens frame 20. The light emitter 30 comprises an LED 42 being as a light source, and a condenser lens 43 for condensing the light emitted from the LED 42 (see FIG. 4). The LED 42 and the condenser lens 43 are disposed in a cover 41 protruding from the lateral side of the lens frame 20.

The driving shaft 21 is disposed parallel to the optical axis L of the taking lens 6. One end of the driving shaft 21 is inserted into a hole of a support wall 45, which is disposed in the camera unit 5, so as to be slidable in the direction of the optical axis L. The other end of the driving shaft 21 is fixed to the piezoelectric device 22. The driving shaft 21 inserted into the hole of the support wall 45 moves in the optical-axis direction in association with expansion and contraction of the piezoelectric device 22. It is preferable that the driving shaft 21 is light and has high rigidity. For example, the driving shaft 21 is made of carbon and beryllium. The driving shaft 21 may have a hollow-rod shape to lighten its weight with high rigidity.

The end portion of the drive shaft 21 is fixed to one side of the piezoelectric device 22, and an opposite side of the piezoelectric device 22 is secured to a fixed wall 46 disposed in the camera unit 5. Although the piezoelectric device 22 is described later in detail, this device 22 is displaced in the optical-axis direction by applied drive pulses. At this time, since the other side of the piezoelectric device 22 is secured to the fixed wall 46, the piezoelectric device 22 is prevented from expanding toward the fixed wall 46. Thus, the piezoelectric device 22 expands toward the support wall 45 retaining the driving shaft 21.

The line sensor 23 comprises a plurality of light receivers 23*a* formed by aligning CCD elements. A length of the line sensor 23 is substantially same with a moving range of the lens frame 20. The line sensor 23 is disposed such that one of the light receivers 23*a* confronts the LED 42 while the lens frame 20 moves along the driving shaft 21. The light condensed by the condenser lens 43 is applied to the light receiver 23*a* confronting the LED 42. The light receiver 23*a* having received the light from the LED 42 outputs a light-reception signal to a lens-position controller 44 described later. With respect to the setting position of the line sensor 23, it is preferable that the line sensor 23 is placed so as to make a clearance, which resides between the light emitter 30 and the light receiver 23*a*, as small as possible for the purpose of preventing the light of the light emitter 30 from leaking inside the camera unit 5.

Although the lens-position controller 44 is described later in detail, this controller 44 is mounted on a circuit board not shown, and obtains positional information of the taking lens 6 on the basis of the light-reception signal outputted from the line sensor 23. The positional information of the taking lens 6 is transmitted to a system controller (see FIG. 6).

Figure 5A:
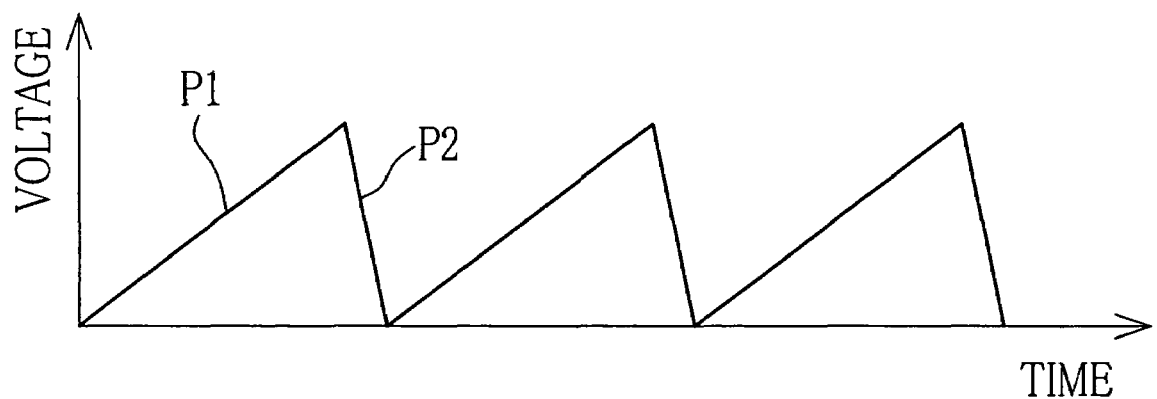
FIGS. 5A and 5B are explanatory illustrations showing waveforms of voltage applied to a piezoelectric device.
Figure 5B:
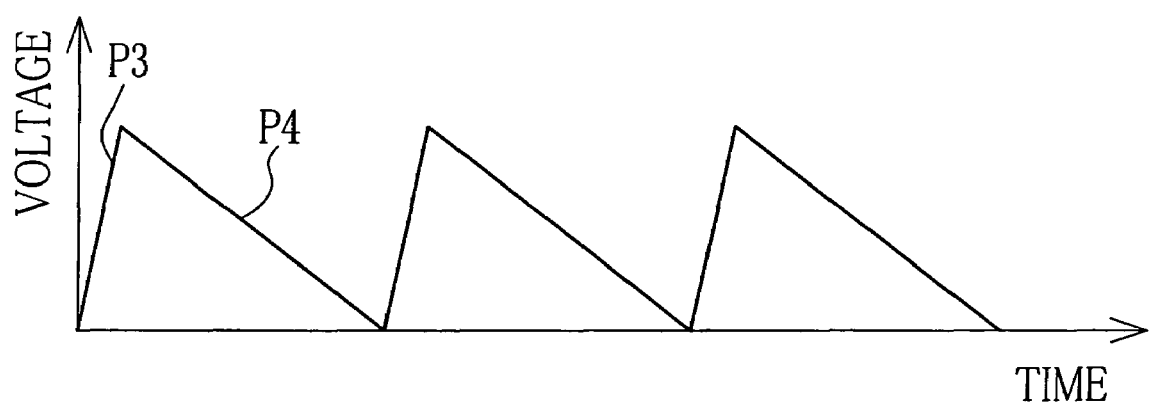

Next, an operation of the piezoelectric device 22 is described below. Vertical axes of graphs shown in FIGS. 5A and 5B represent voltage, and horizontal axes thereof represent time. By the way, hereinafter, a forward direction is defined as a direction in which the lens frame 20 moves along the driving shaft 21 toward the support wall 45, and a backward direction is defined as a direction in which the lens frame 20 moves along the driving shaft 21 toward the piezoelectric device 22.

A drive pulse having a waveform shown in FIG. 5A is applied to the piezoelectric device 22 from a drive-pulse generating circuit 65 (see FIG. 6) to move the lens frame 20 in the forward direction. The waveform shown in FIG. 5A includes a gentle leading edge P1 and a steep trailing edge P2 succeeding to the leading edge P1. Upon applying the leading edge P1, the piezoelectric device 22 gently expands in the forward direction. In association with this, the driving shaft 21 gently moves in the forward direction as well. At this time, on condition that frictional forces caused between the driving shaft 21 and the concave 33 and between the driving shaft 21 and the V-shaped clasp 34 are stronger than a force applied by the piezoelectric device 22 at the time of movement of the drive shaft 21, the lens frame 20 moves in the forward direction together with the driving shaft 21 in a state frictionally joined with each other.

Meanwhile, upon applying the trailing edge P2 to the piezoelectric device 22, this device 22 rapidly contracts in the backward direction. Thus, the piezoelectric device 22 rapidly moves the driving shaft 21 in the backward direction. At his time, an inertia force of the lens frame 20 overcomes the frictional forces caused between the driving shaft 21 and the concave 33 and between the driving shaft 21 and the V-shaped clasp 34. In virtue of this, only the driving shaft 21 moves in the backward direction and the lens frame 20 stays at the current position without moving. By successively applying the drive pulses having the waveform shown in FIG. 5A, the lens frame 20 is gradually moved along the driving shaft 21 in the forward direction.

In the meantime, the lens frame 20 moved in the forward direction is moved in the backward direction by applying a drive pulse having a waveform, which is shown in FIG. 5B, to the piezoelectric device 22. The waveform shown in FIG. 5B includes a steep leading edge P3 and a gentle trailing edge P4 succeeding to the leading edge P3. Upon applying the leading edge P3, the piezoelectric device 22 rapidly expands in the forward direction. At this time, the inertia force of the lens frame 20 overcomes the frictional forces caused between the driving shaft 21 and the concave 33 and between the driving shaft 21 and the V-shaped clasp 34. Thus, the lens frame 20 stays at the current position without moving and only the driving shaft 21 moves in the forward direction. Successively, upon applying the trailing edge P4, the piezoelectric device 22 gently contracts in the backward direction and the driving shaft 21 gently moves in the backward direction. At this time, since the frictional forces caused between the driving shaft 21 and the concave 33 and between the driving shaft 21 and the V-shaped clasp 34 are stronger than the force, which is applied by the piezoelectric device 22 at the time of movement of the drive shaft 21, the lens frame 20 moves in the backward direction together with the driving shaft 21 in the state frictionally joined with each other. By successively applying the drive pulses having the waveform shown in FIG. 5B, the lens frame 20 is gradually moved along the driving shaft 21 in the backward direction.

Figure 6:
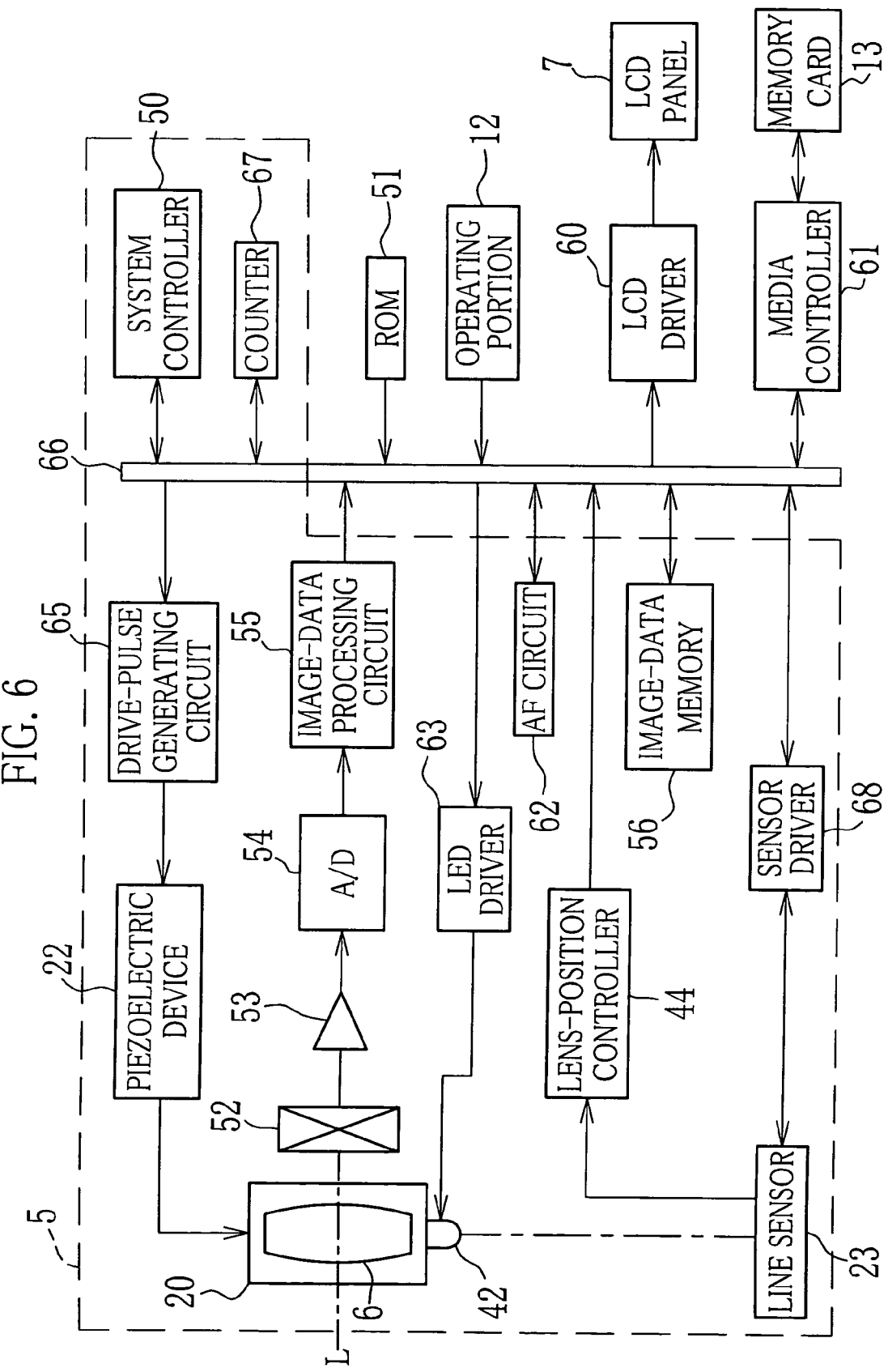
FIG. 6 is a block diagram showing an electrical structure of a camera unit.

FIG. 6 shows an electrical structure of the camera unit 5. The system controller 50 controls each section of the camera unit 5 in response to input operation performed by using various buttons of the operating portion 12. When the cellphone is switched into a shooting mode, the system controller 50 reads various programs stored in a ROM 51. On the basis of the programs read out via a data bus 66, the system controller 50 drives the respective sections of the camera unit 5 to output an image signal from a CCD 52 being as a solid-state image sensor.

The image signals sequentially outputted from the CCD 52 are amplified by a gain variable preamplifier 53 up to a proper level, and then, are converted into digital image data by an A/D converter 54. For the image data obtained in this way, an image-data processing circuit 55 performs well-known image processing. After that, the image data is sequentially written in an image-data memory 56 every picture. The image data written in the image-data memory 56 is read out by the system controller 50. For the read image data, the image-data processing circuit 55 performs varied image processing. After that, the image data is used for displaying the image on the LCD panel 7 via an LCD driver 60. Alternatively, the image data is written in the memory card 13 via a media controller 61.

An LED driver 63 controls the LED 42 of the light emitter 30. When the shooting mode is selected by handling the selection button of the operating portion 12, a turn-on signal is sent from the system controller 50 to the LED driver 63. In response to the turn-on signal, the LED driver 63 turns on the LED 42 of the light emitter 30. At the end of the shooting mode, the system controller 50 sends a turn-off signal to the LED driver 63 to turn off the LED 42.

The line sensor 23 is controlled by the system controller 50 via a sensor driver 68. As to the line sensor 23, the light receiver 23a confronting the LED 42 receives the light, and the light receiver 23a receiving the light outputs a high-level signal. In contrast, the light receiver 23a receiving no light outputs a low-level signal. The light-reception signal outputted from the light receiver 23a receiving the light is sent to the lens-position controller 44 as a detection signal.

Incidentally, when the foremost light receiver 23a of the line sensor 23 receives the light, the taking lens 6 moves to the foremost position in the forward direction. This foremost position is defined as an original position for controlling the position of the taking lens 6.

The lens-position controller 44 obtains positional information of the taking lens 6 on the basis of the light-reception signal, which is outputted from the line sensor 23, to send the positional information to the system controller 50. By virtue of this, it is possible to detect the position of the taking lens 6. The lens-position controller 44 also works as an original-position detector. When the lens-position controller 44 has received the light-reception signal, which is outputted from the foremost light receiver 23 of the line sensor 23 detecting the taking lens 6, the lens-position controller 44 judges, on the basis of this light-reception signal, that the taking lens 6 is placed at the original position. Further, the lens-position controller 44 sends an original-position detection signal to the system controller 50 together with the positional information. Meanwhile, when it is judged that the taking lens 6 is not placed at the original position, the lens-position controller 44 sends only the positional information to the system controller 50. Incidentally, although the original position of the taking lens 6 is defined as the foremost position in the forward direction, this is not exclusive.

An AF circuit 62 calculates an AF evaluated value from contrast of the image data corresponding to one picture produced by the image-data processing circuit 55. In general, the contrast of the image is highest when a subject image comes into focus. At this time, the AF evaluated value is also highest. The AF evaluated value is inputted into the system controller 50 as an AF-evaluated-value signal. The system controller 50 controls the drive-pulse generating circuit 65, constantly monitoring the AF-evaluated-value signal sequentially inputted, to move the taking lens 6 to a focus position.

The kind and the number of the drive pulses to be applied to the piezoelectric device 22 are determined on the basis of a drive signal sent from the system controller 50. The drive-pulse generating circuit 65 applies the determined drive pulse to the piezoelectric device 22. In accordance with the kind and the number of the drive pulses, the piezoelectric device 22 expands and contracts to move the lens frame 20 in the forward and backward directions in association with the expansion and contraction of the piezoelectric device 22. In the meantime, the system controller 50 activates a counter 67 to count the number of the drive pulses generated by the drive-pulse generating circuit 65.

Figure 2:
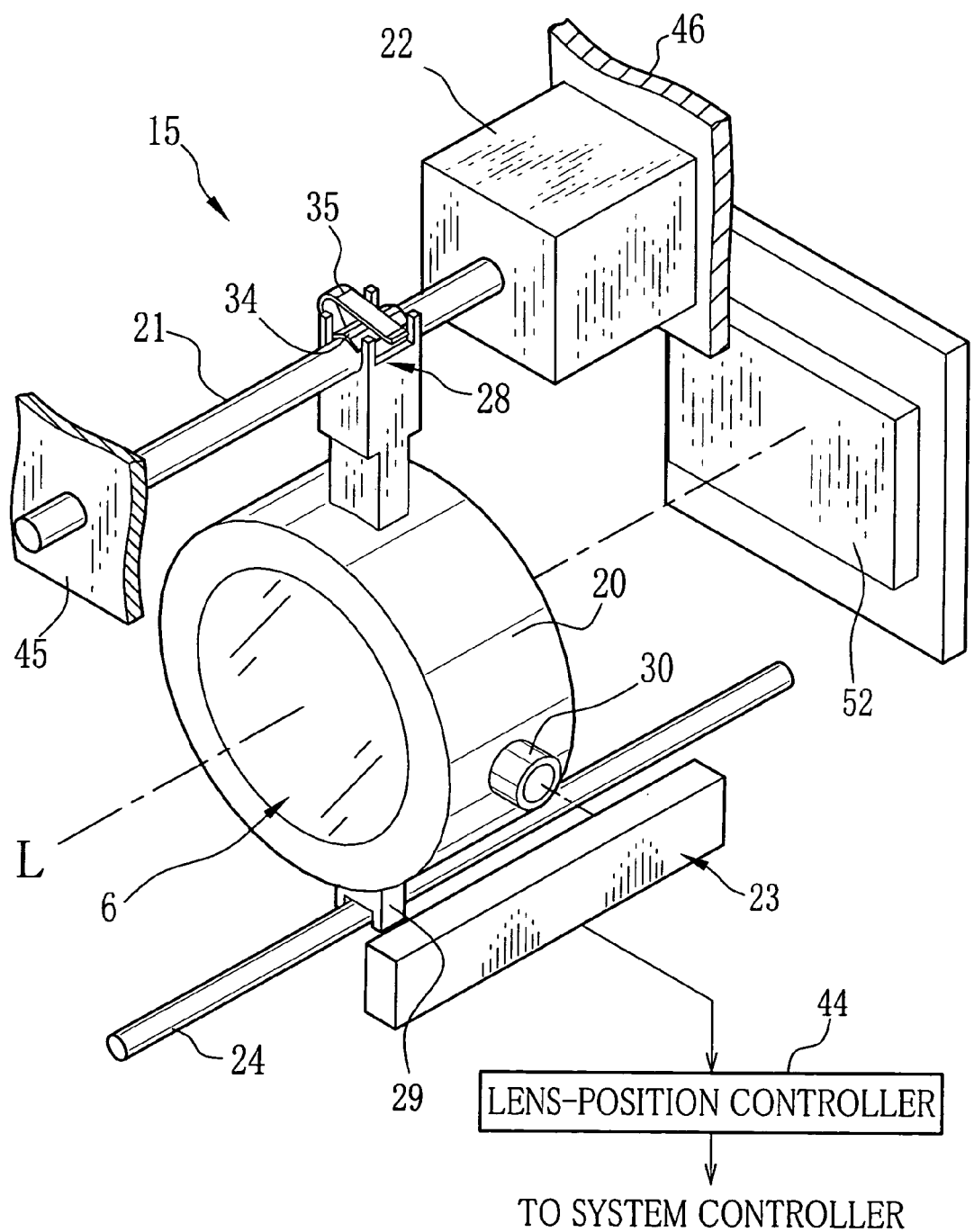
FIG. 2 is a perspective view showing a structure of the lens device.
Figure 3:
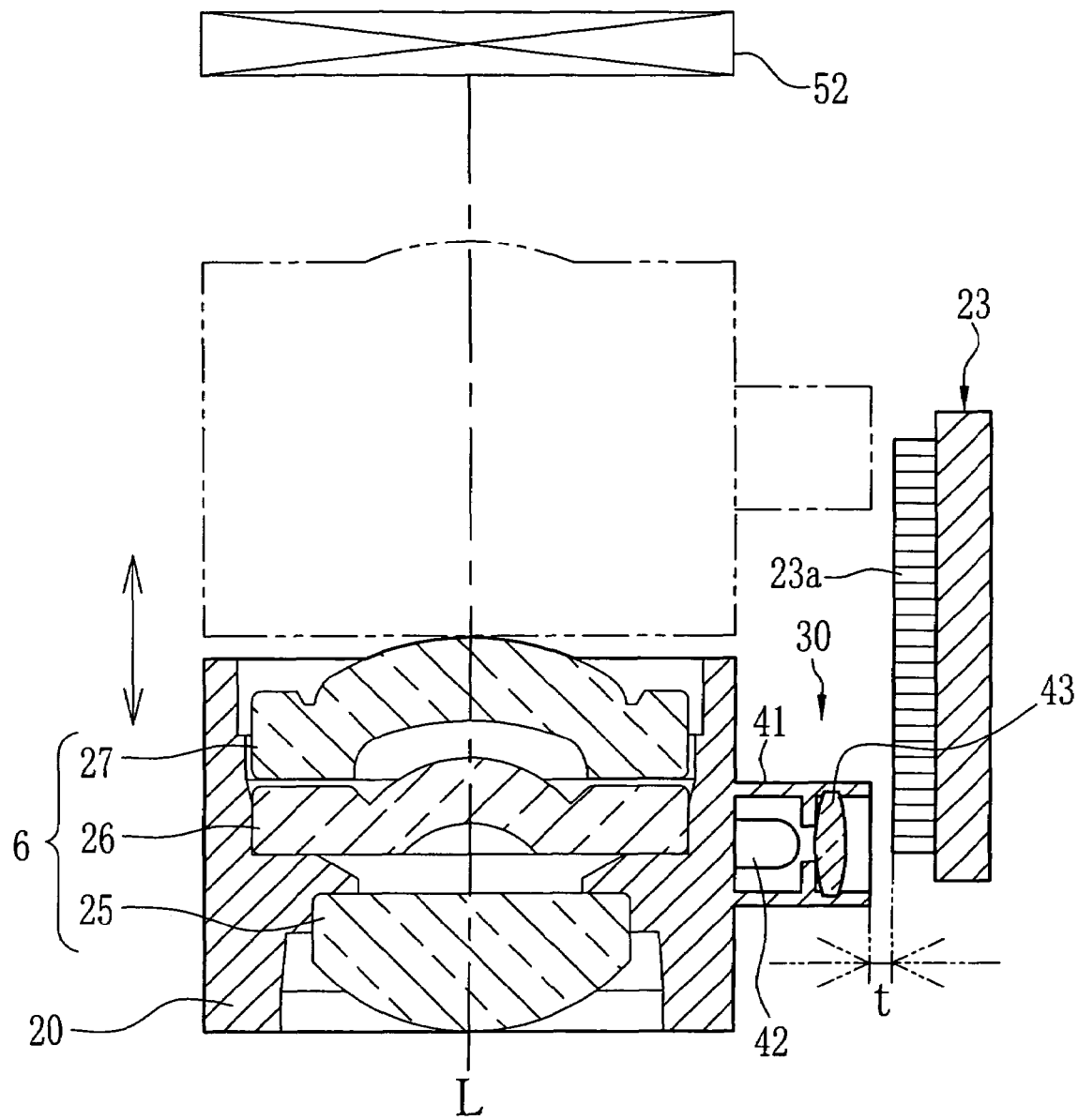
FIG. 3 is a partial section view showing a moving range of a lens frame.

By the way, the lens device 15 comprises the lens-position controller 44, the LED driver 63, the drive-pulse generating circuit 65 and the sensor driver 68, which are shown in FIG. 6, in addition to the components of the taking lens 6, the piezoelectric device 22 and so forth, which are shown in FIG. 2.

Figure 7:
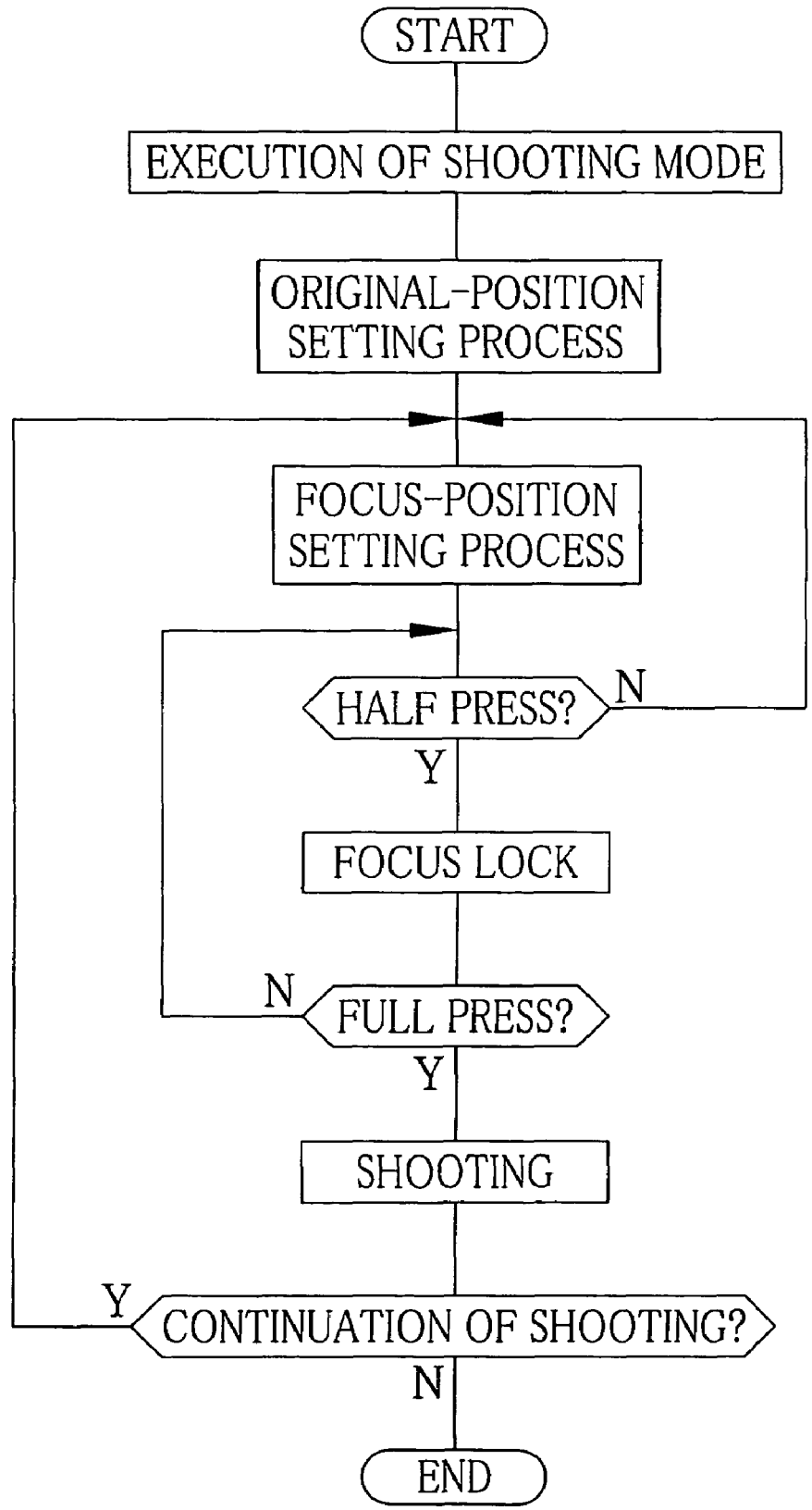
FIG. 7 is a flowchart explaining a sequence of a shooting process.

Next, a shooting process of the camera-equipped cell-phone according to the present invention is described below, referring to a flowchart shown in FIG. 7. In order to perform shooting with the camera-equipped cell-phone, the receiver unit 3 and the transmitter unit 4 kept in the folded state are opened first, and the selection button of the operating portion 12 is operated to select the shooting mode. Upon selection of the shooting mode, the LED 42 of the light emitter 30 is turned on and a process for activating the respective sections of the camera unit 5 is executed to activate the line sensor 23, the CCD 52 and so forth. After completing this activating process, an original-position setting process of the taking lens 6 is executed.

In the original-position setting process, the lens-position controller 44 obtains the positional information of the taking lens 6 on the basis of the light-reception signal outputted from the light receiver 23a of the line sensor 23. At the same time, the lens-position controller 44 judges whether or not the taking lens 6 is placed at the original position. When the lens-position controller 44 has judged that the taking lens 6 is placed at the original position, the lens-position controller 44 sends the original-position detection signal to the system controller 50 together with the positional information of the taking lens 6. The system controller 50 resets the counter 67 on the basis of the received positional information and the original-position detection signal to complete the original-position setting process.

When the lens-position controller 44 judges that the taking lens 6 is not placed at the original position, only the positional information is sent to the system controller 50. On the basis of this positional information, the system controller 50 controls the drive-pulse generating circuit 65 to move the taking lens 6 to the original position. At this time, the line sensor 23 and the lens-position controller 44 repeatedly obtain the position of the taking lens 6. At the same time, the lens-position controller 44 repeatedly judges whether or not the taking lens 6 moves to the original position. When it has been judged that the taking lens 6 is placed at the original position, the lens-position controller 44 sends the original-position detection signal to the system controller 50 together with the positional information. The system controller 50 resets the counter 67 on the basis of the positional information and the original-position detection signal to complete the original-position setting process.

When the piezoelectric device 22 used in this embodiment moves the lens frame 20, sometimes a movement amount of the lens frame 20 does not correspond to the drive pulses applied to the piezoelectric device 22. In view of this, the system controller 50 controls the movement of the taking lens 6 on the basis of a count value, which is obtained by counting the drive pulses with the counter 67, and the positional information of the taking lens 6, which is obtained by the line sensor 23 and the lens-position controller 44.

After completing the original-position setting process, a focus-position setting process of the taking lens 6 is executed. In the focus-position setting process, the system controller 50 obtains the AF evaluated value from the AF circuit 62 while controlling the drive-pulse generating circuit 65 to move the taking lens 6 along the driving shaft 21 in the forward and backward direction. The system controller 50 controls the drive-pulse generating circuit 65 on the basis of the count value of the counter 67 and the positional information of the taking lens 6, which is obtained by the line sensor 23 and the lens-position controller 44, so as to make the sequentially obtained AF evaluated value highest. Consequently, the taking lens 6 is moved to the focus position.

The system controller 50 judges whether or not the shutter button of the operating portion 12 is pressed halfway. When it is judged that the shutter button is not pressed halfway, the focus-position setting process is repeated until the shutter button is pressed halfway. When the half-press of the shutter button has been judged, the taking lens 6 is fixed to the focus position to lock the focus.

After that, the system controller 50 judges whether or not the shutter button is fully pressed. When the shutter button is released without being fully pressed, locking the focus is released and the system controller 50 sets a preparation state for locking the focus, in readiness for the next judgment of the half-press of the shutter button. Meanwhile, when the shutter button has been fully pressed, the system controller 50 controls the media controller 61 to store the image data in the memory card 13.

Upon the full-press of the shutter button, shooting is performed to record the image data in the memory card 13. In a case shooting is successively performed after recording the image data in the memory card 13, the focus-position setting process is continuously performed. Incidentally, the original-position setting process is performed at the time of execution of the shooting mode. However, this is not exclusive. For example, the original-position setting process may be performed after storing the taken image data in the memory card upon the full-press of the shutter button.

As described above, the light emitter 30 is disposed on the lateral side of the lens frame 20 so as to separate from the connector 28 by the rotational angle of about 90 degrees around the optical axis L, and the light from the light emitter 30 is received by the light receiver 23a of the line sensor 23 to detect the position of the taking lens 6. Thus, it is possible to accurately detect the position of the taking lens 6 even if the lens frame 20 inclines. Further, since the condenser lens 43 condenses the light of the LED 42 to the light receiver 23a, it is possible to prevent a flare and a ghost image from occurring due to the light of the LED 42.

The light emitter 30 is disposed on the lens frame 20 integrally holding the first to third lenses 25 to 27. However, the light emitter 30 may be disposed on each of lens frames individually holding the first to third lenses 25 to 27. Moreover, the light emitter 30 may be disposed on a lens frame holding a zoom lens. In this case, the positions of the respective lenses may be detected by the line sensor 23.

In the above embodiment, the light emitter 30 is disposed at the right side of the lens frame 20, viewing in the incident direction of the subject light. However, this is not exclusive. The light emitter 30 may be disposed at the left side of the lens frame 20 so as to separate from the connector 28 by a rotational angle of about 90 degrees around the optical axis L.

Moreover, in the above embodiment, the line sensor 23 is employed for detecting the position of the taking lens 6. However, instead of the line sensor, a position detecting device may be disposed in the optical-axis direction so as to confront the light emitter 30.

Figure 8:
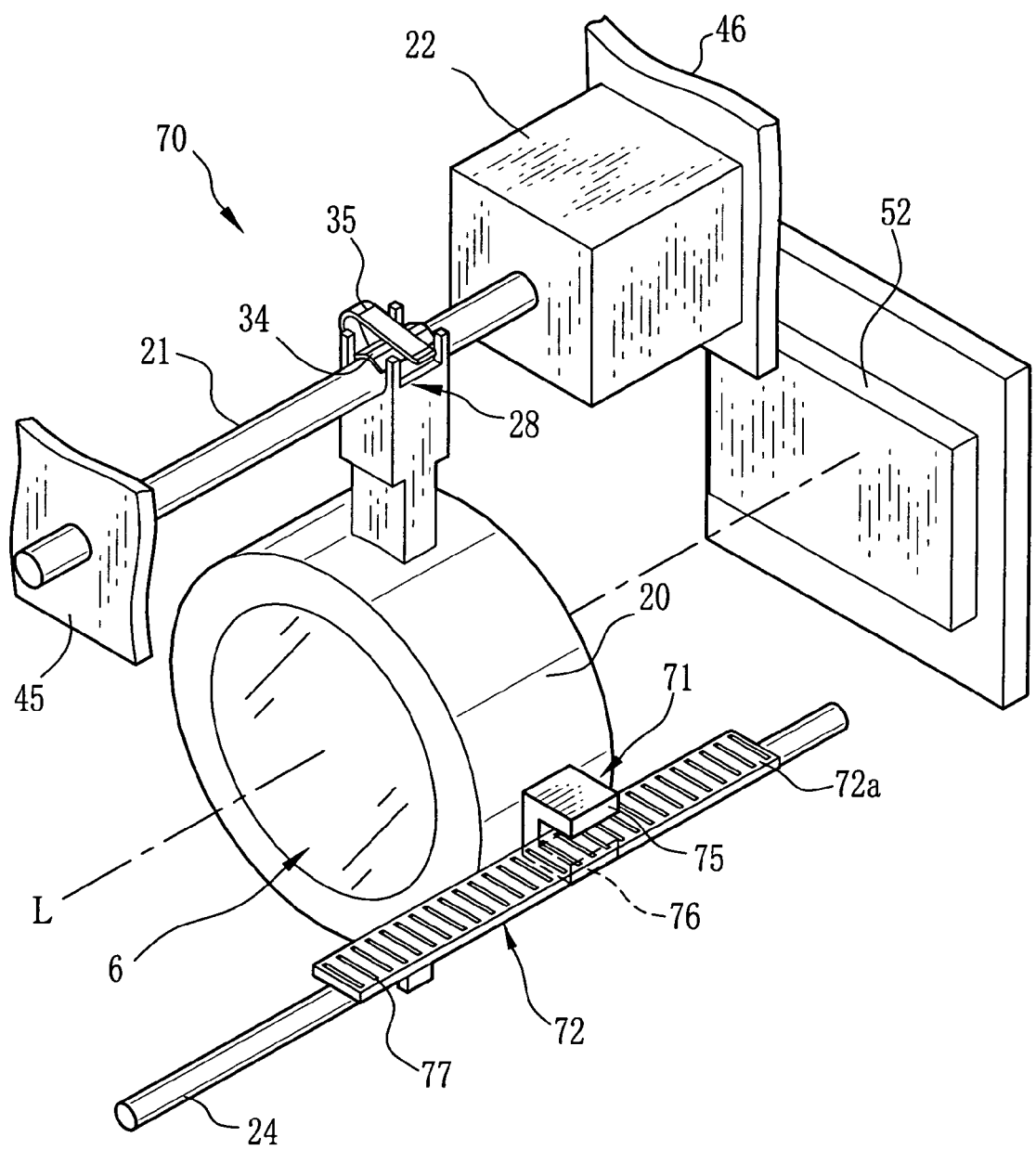
FIG. 8 is a perspective view showing a structure of a lens device in which a transmission-type photoelectronic sensor and an encoder plate are used.

Next, the second embodiment according to the present invention is described below, referring to FIG. 8. Hereinafter, a component identical with that of the first embodiment is denoted by the same reference numeral and overlapping description is abbreviated. A lens device 70 of the second embodiment comprises a transmission-type photoelectronic sensor 71 being as a detector, and a belt-like encode plate 72 to be detected thereby. The photoelectronic sensor 71 is disposed on a lateral side of the lens frame 20 so as to separate from the connector 28 by a rotational angle of about 90 degrees around the optical axis L. The encode plate 72 has a length substantially identical with the moving range of the lens frame 20. A longitudinal direction of the encode plate 72 is parallel to the optical axis L. The encode plate 72 is disposed between a light emitter 75 and the light receiver 76 of the photoelectronic sensor 71. A detection surface 72a of the encode plate 72 is provided with a plurality of slits 77 formed at predetermined intervals in the longitudinal direction.

A light-emitting diode is used as the light emitter 75 of the photoelectronic sensor 71, and a phototransistor is used as the light receiver 76. When the lens frame 20 moves, infrared rays radiated from the light emitter 75 are received by the light receiver 76 through the slit 77 of the encode plate 72. Thereupon, the photoelectronic sensor 71 sends a detection signal to a lens-position controller 79 (see FIG. 9).

Figure 9:
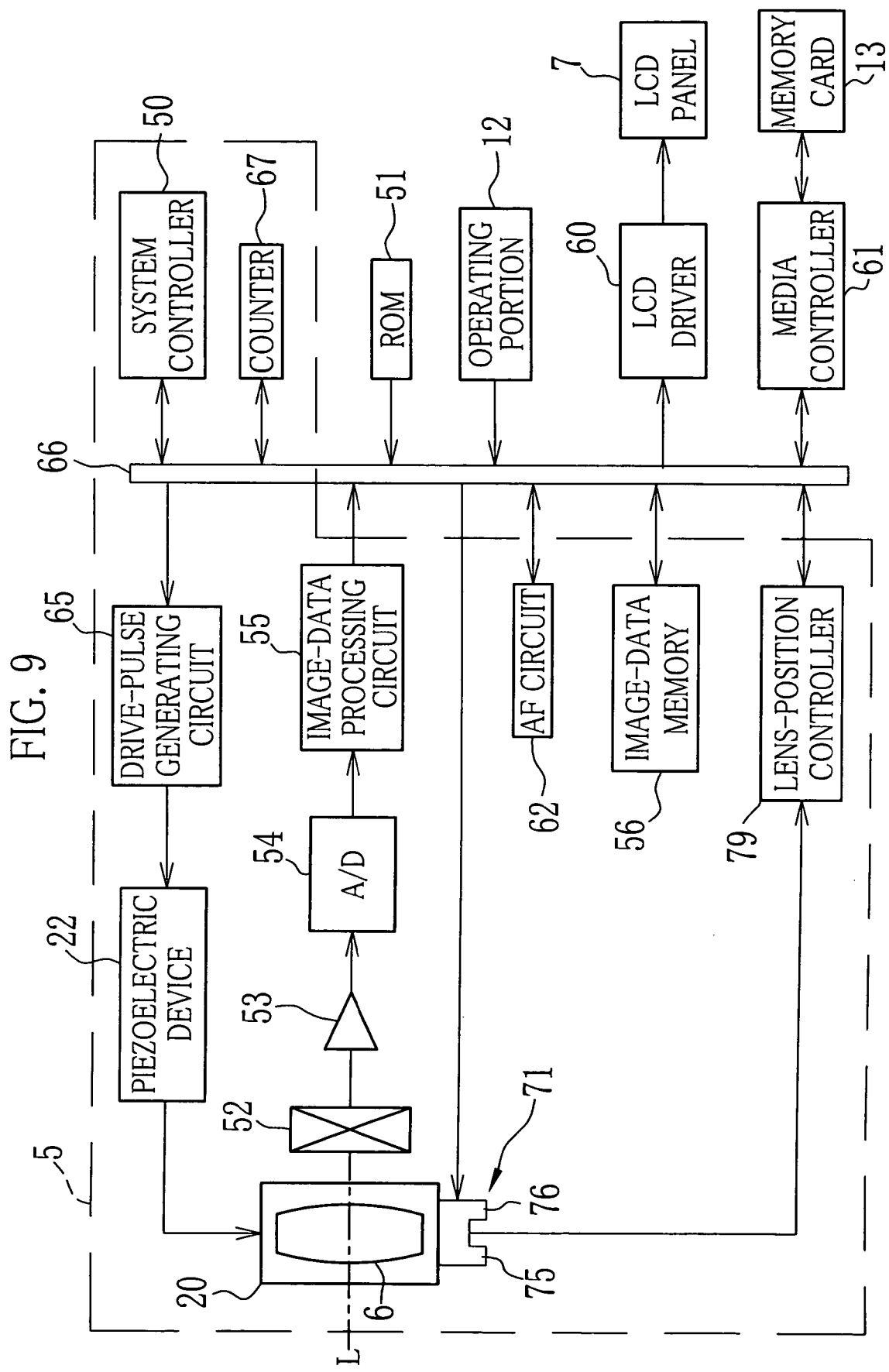
FIG. 9 is an electrical block diagram of the camera unit in which the lens device uses the transmission-type photoelectronic sensor.

As shown in FIG. 9, the photoelectronic sensor 71 is connected to the lens-position controller 79. When moving the lens frame 20, the drive signal is sent from the system controller 50 to the drive-pulse generating circuit 65 and the lens-position controller 79. On the basis of the drive signal, the piezoelectric device 22 expands and contracts to move the lens frame 20 along the driving shaft 21. The photoelectronic sensor 71 sends the detection signal to the lens-position controller 79. On the basis of the inputted drive signal, the lens-position controller 79 detects the moving direction (forward or backward direction) of the lens frame 20. Further, the lens-position controller 79 detects a moving distance of the lens frame 20 by counting the detection signal to obtain the positional information of the taking lens 6.

In this way, the lens-position controller 79 obtains the positional information of the taking lens 6 on the basis of the detection signal sent from the photoelectronic sensor 71, and the drive signal sent from the system controller 50. The obtained positional information is sent to the system controller 50. Moreover, the lens-position controller 79 detects the original position of the taking lens 6 as well. On the basis of the detection signal of the photoelectronic sensor 71 and the drive signal of the system controller 50, the lens-position controller 79 judges whether or not the obtained positional information of the taking lens 6 corresponds to the foremost position of the encode plate 72. When it has been judged that the taking lens 6 is placed at the foremost position of the encode plate 72, the taking lens 6 is judged to be placed at the original position. And then, the original-position detection signal is sent to the system controller 50 together with the positional information. As described above, the photoelectronic sensor 71 is disposed on the lateral side of the lens frame 20 so as to separate from the connector 28 by the rotational angle of about 90 degrees around the optical axis L, and the encode plate 72 is disposed in the optical-axis direction so as to confront the photoelectronic sensor 71. Thus, it is possible to accurately detect the position of the taking lens 6.

Figure 10:
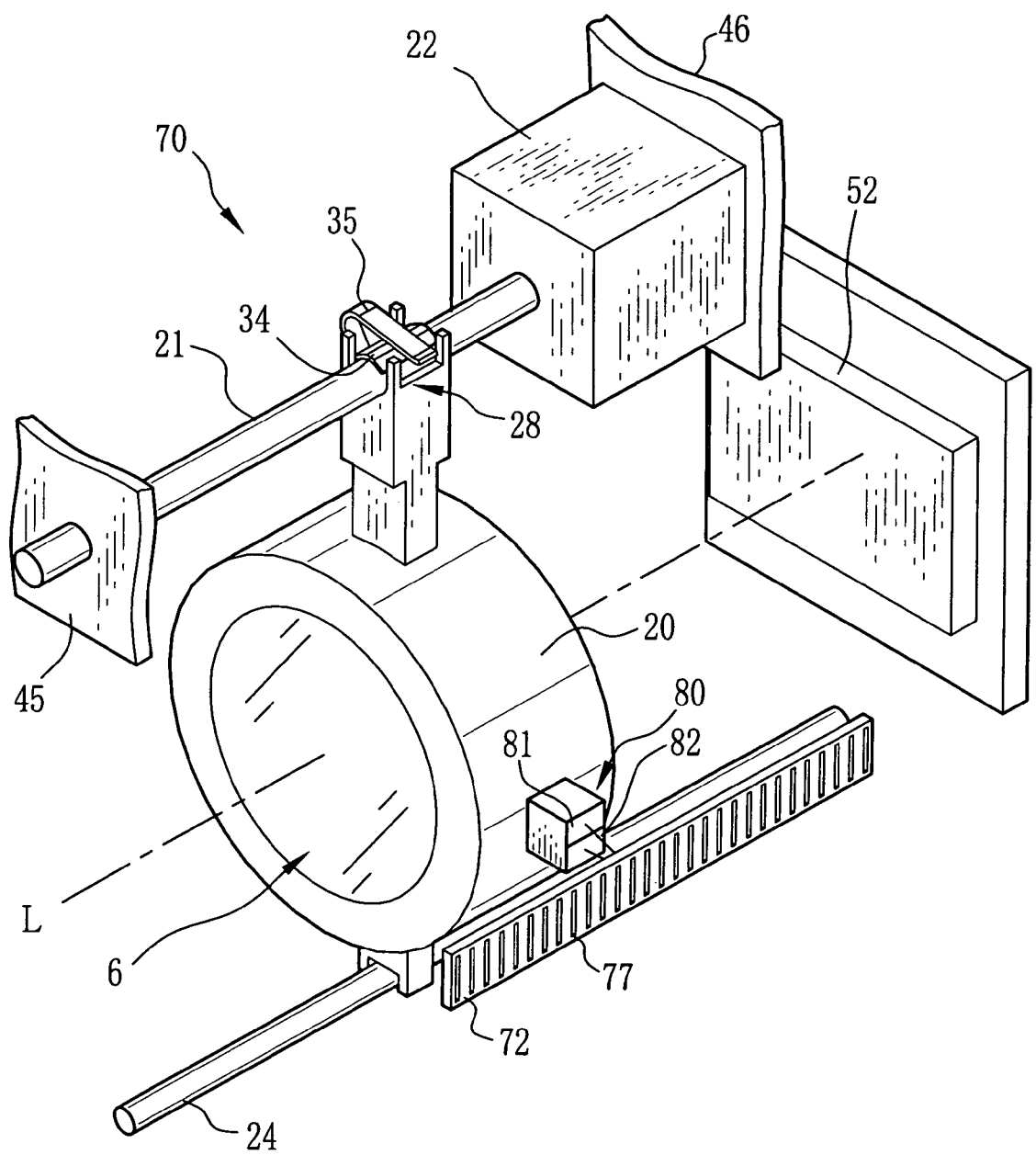
FIG. 10 is a perspective view showing a structure of a lens device employing a reflection-type photoelectronic sensor and an encoder plate.

In the second embodiment, the transmission-type photoelectronic sensor is employed. However, instead of this sensor, a reflection-type photoelectronic sensor may be employed. In this case, such as shown in FIG. 10, the reflection-type photoelectronic sensor 80 is disposed on the lateral side of the lens frame 20 so as to separate from the connector 28 by a rotational angle of about 90 degrees around the optical axis L. The encode plate 72 is disposed such that the detection surface 72a thereof confronts a light emitter 81 and a light receiver 82 of the reflection-type photoelectronic sensor 80.

When the lens frame 20 moves along the driving shaft 21, infrared rays radiated from the light emitter 81 of the photoelectronic sensor 80 are reflected by the detection surface 72a residing between the slits 77. The reflected infrared rays are received by the light receiver 82. Thereupon, the photoelectronic sensor 80 sends a detection signal to the lens-position controller 79. When the infrared rays are emitted to the slit 77, almost all of the infrared rays pass through the slit 77. Consequently, the infrared rays reflected toward the light receiver 82 decrease. At this time, the detection signal is not sent from the photoelectronic sensor 80 to the lens-position controller 79. On the basis of the detection signal, which is sent from the reflection-type photoelectronic sensor 80, and the drive signal, which is sent from the system controller 50, the lens-position controller 79 obtains the positional information of the taking lens 6. At the same time, the lens-position controller 79 detects the original position of the taking lens 6. Thus, it is possible to accurately detect the position of the taking lens 6.

Figure 11:
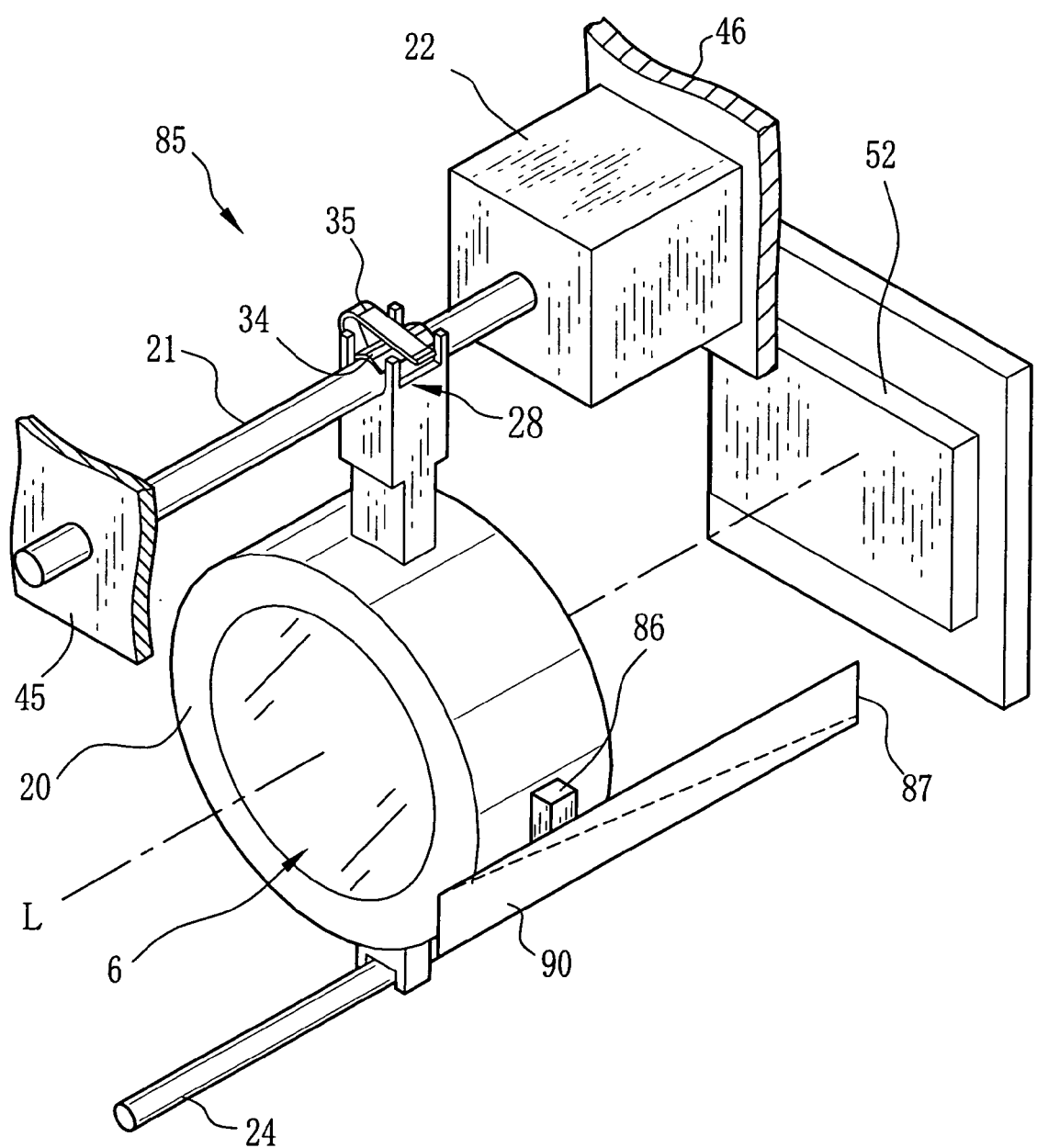
FIG. 11 is a perspective view showing a structure of a lens device employing a magnetic sensor and a magnetic tape.

Next, the third embodiment according to the present invention is described below, referring to FIG. 11. A lens device 85 of the third embodiment comprises a magnetic sensor 86 being as a detector, and a magnetic tape 87 to be detected thereby. The magnetic tape 87 is a magnetic material having a length identical with the moving range of the lens frame 20. The magnetic sensor 86 is disposed on the lateral side of the lens frame 20 so as to separate from the connector 28 by a rotational angle of about 90 degrees around the optical axis L. For example, the magnetic sensor 86 includes a MR device and an amplifier. The MR device outputs a voltage signal in proportion to intensity of external magnetic fields. The voltage signal is amplified by the amplifier, and the amplified voltage signal is sent to the lens-position controller 79 as a detection signal. The magnetic tape 87 is disposed so as to make a longitudinal direction thereof parallel to the optical axis L and so as to confront the magnetic sensor 86. The magnetic tape 87 is magnetized in advance regarding an area thereof extending under a dotted line shown in FIG. 11 to form a triangular magnetized area 90.

When the magnetic sensor 86 confronting the magnetic tape 87 moves along the driving shaft 21 in the forward direction, the magnetized area 90 confronting the magnetic sensor 86 increases and the detected magnetic field becomes stronger. In proportion to the intensity of the magnetic field, the magnetic sensor 86 sends the corresponding voltage signal to the lens-position controller 79 as the detection signal. The lens-position controller 79 obtains the positional information of the taking lens 6 on the basis of the voltage signal. At the same time, the lens-position controller 79 detects the original position of the taking lens 6 by comparing the voltage signal with a preset voltage signal. As described above, the magnetic sensor 86 is disposed on the lens frame 20 so as to separate from the connector 28 by about 90 degrees around the optical axis L, and the magnetic tape 87 is disposed in the optical-axis direction so as to confront the magnetic sensor 86. Thus, the position of the taking lens 6 is accurately detected. Further, since the magnetic sensor 86 is used, a good image may be taken without causing a flare and a ghost image on the taken image. Incidentally, although the MR device is used as the magnetic sensor 86, it is possible to utilize a GMR (Giant magnetoresistance) device and a hall element.

Figure 12:
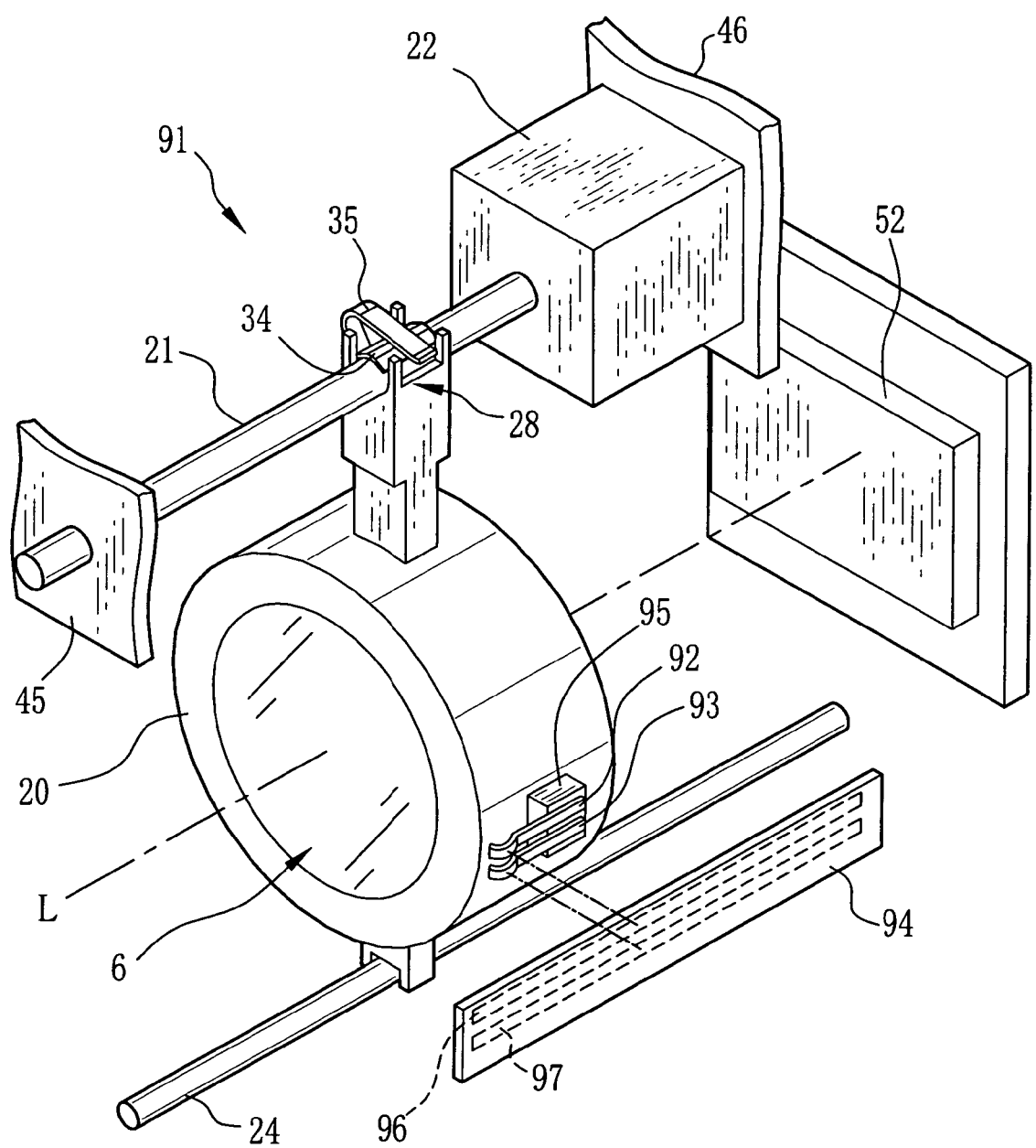
FIG. 12 is a perspective view showing a structure of a lens device employing a slider and a substrate having a conductive pattern.

Next, the fourth embodiment according to the present invention is described below, referring to FIG. 12. A lens device 91 of the fourth embodiment comprises metallic sliders 92 and 93 being as a detector, and a belt-shaped substrate 94 to be detected thereby. The substrate 94 includes a conductive pattern. One end portion of each of the sliders 92 and 93 is fixed to an attachment base 95, which is disposed on the lateral side of the lens frame 20 so as to separate from the connector 28 by a rotational angle of about 90 degrees around the optical axis L. A resistive pattern 96 and a conductive pattern 97 are formed on one surface of the substrate 94. The respective patterns 96 and 97 are arranged in a longitudinal direction of the substrate 94 at a predetermined interval. The other end portions of the sliders 92 and 93 abut on the resistive pattern 96 and the conductive pattern 97 respectively.

Figure 13:
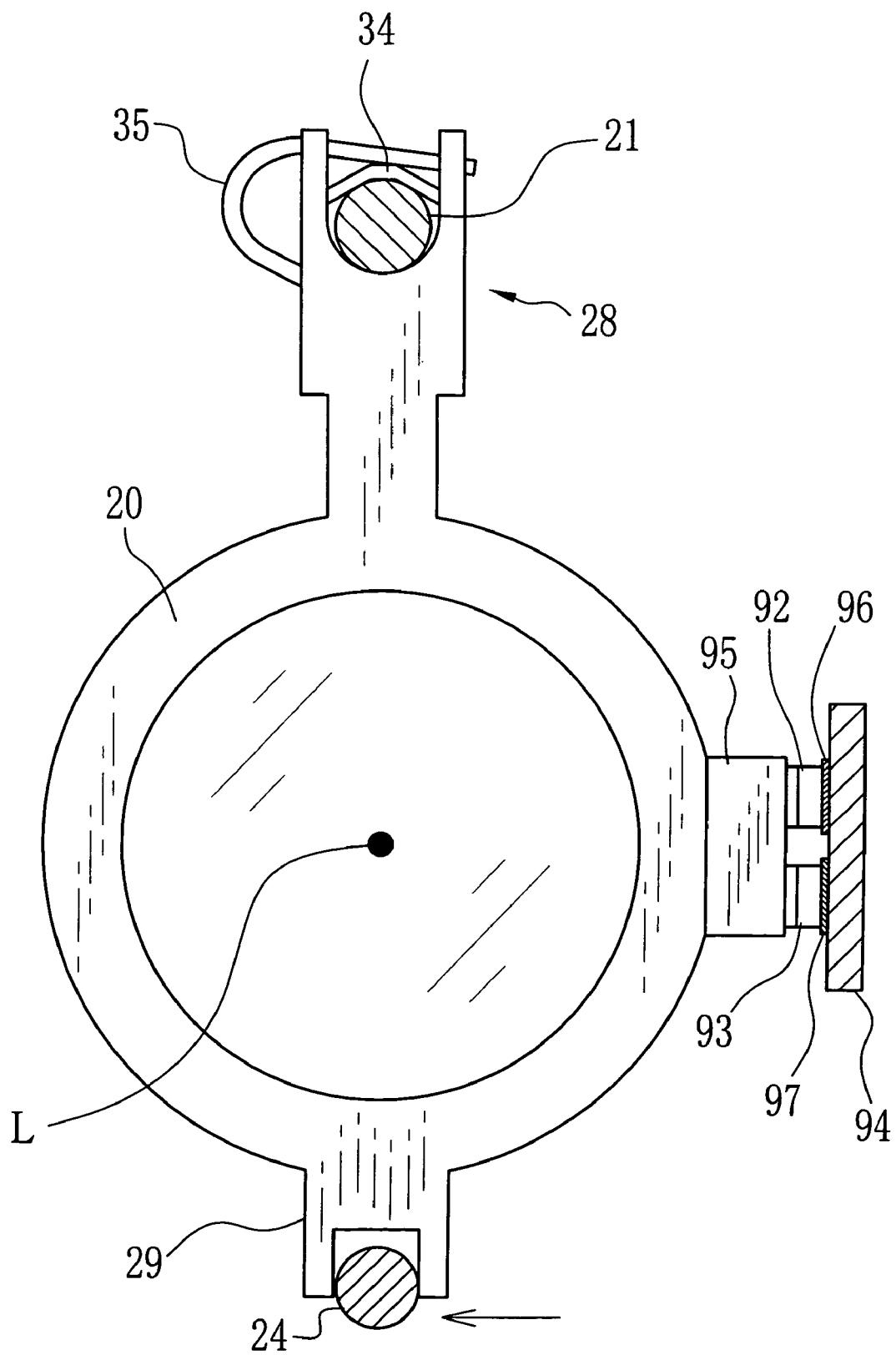
FIG. 13 is a front view of the lens device employing the slider and the substrate having the conductive pattern.

The respective sliders 92 and 93 are constituted by an urging member. When the end portions of the sliders 92 and 93 abut on the patterns 96 and 97 of the substrate 94, the lens frame 20 is biased by urging forces of the sliders 92 and 93 in a direction of an arrow shown in FIG. 13, and a part of an inner surface of the guide portion 29 abuts on the guide rod 24. By virtue of the clearance of the guide rod 24 and the guide portion 29, it is possible to prevent the lens frame 20 from vibrating while the lens frame 20 moves along the driving shaft 21.

When the lens frame 20 moves along the drive shaft 21 in association with the expansion and the contraction of the piezoelectric device 22, the end portions of the sliders 92 and 93 slide on the respective patterns 96 and 97 to detect a value of resistance. The detected value of resistance is sent to the lens-position controller 79 as the detection signal. The lens-position controller 79 obtains the positional information of the taking lens 6 from the value of resistance. At the same time, the lens-position controller 79 detects the original position as well. The obtained information concerning the position of the taking lens 6 is sent to the system controller 50. As described above, the sliders 92 and 93 are disposed at the lateral side of the lens frame 20 so as to separate from the connector 28 by about 90 degrees around the optical axis L. Further, the substrate 94 having the resistive pattern 96 and the conductive pattern 97 is disposed in the optical-axis direction so as to confront the sliders 92 and 93. Thus, the position of the taking lens 6 may be accurately detected. In addition, the structure is simplified and it is possible to reduce the size and to lower the cost.

In the foregoing embodiment, the piezoelectric device 22 is employed as the driving device for moving the lens frame 20 in the optical-axis direction. However, this is not exclusive. It is possible to use a stepping motor, a DC motor and so forth. In this case, it is preferable that a lead screw is used as a shaft member and the lead screw is rotated by a rotational force of the motor to move the lens frame in the optical-axis direction.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:
1. A lens device comprising:
  a lens frame for holding a lens;
  a shaft member disposed in parallel to an optical axis of said lens;
  a driving device for applying a driving force to said shaft member to move said lens frame in a direction of said optical axis;
  a connector for connecting said shaft member and said lens frame to transmit said driving force to said lens frame;
  a guide member disposed in parallel to said optical axis to guide said lens frame moving in the direction of the optical axis;
  a first detection member disposed at a lateral side of said lens frame so as to separate from said connector by a substantially right angle around said optical axis;
  a second detection member confronting said first detection member and disposed in the direction of said optical axis, one of said first and second detection members detecting the other thereof;
  a lens-position controller for obtaining positional information of said lens on the basis of a detection signal outputted by detecting one of said first and second detection members with the other thereof; and an original-position detector for judging whether or not said positional information of said lens corresponds to a preset original position of said lens, said original-position detector judging said positional information before said lens frame is moved to a target position,
wherein said lens frame is moved to said target position after being moved to said original position when said original-position detector judges that said positional information of said lens does not correspond to said original position.

2. A lens device according to claim 1, wherein said driving device is a piezoelectric device, which expands and contracts upon application of drive pulses and to which one end of said shaft member is fixed so that said shaft member reciprocates in the direction of said optical axis in association with expansion and contraction of said piezoelectric device,
wherein said connector is frictionally joined to said shaft member, and by making velocities for expanding and contracting said piezoelectric device different in accordance with said drive pulses to be applied thereto, said lens frame is moved in the direction of said optical axis by virtue of two states, in one of which said connector moves together with said shaft member due to frictional joint of them, and in the other of which said connector overcomes the frictional joint and is substantially prevented from moving.

3. A lens device according to claim 1, wherein said lens frame includes a guide portion for slidably engaging with said guide member, and said guide portion is disposed at a lower portion of said lens frame so as to separate from said connector by a substantially 180-degree angle around said optical axis.

4. A lens device comprising:
a lens frame for holding a lens;
a shaft member disposed in parallel to an optical axis of said lens;
a driving device for applying a driving force to said shaft member to move said lens frame in a direction of said optical axis;
a connector for connecting said shaft member and said lens frame to transmit said driving force to said lens frame;
a guide member disposed in parallel to said optical axis to guide said lens frame moving in the direction of the optical axis;
a first detection member disposed at a lateral side of said lens frame so as to separate from said connector by a substantially right angle around said optical axis;
a second detection member confronting said first detection member and disposed in the direction of said optical axis, one of said first and second detection members detecting the other thereof; and
a lens-position controller for obtaining positional information of said lens on the basis of a detection signal outputted by detecting one of said first and second detection members with the other thereof;
wherein said first detection member is a light source for emitting light, and said second detection member is a line sensor for detecting said light.

5. A lens device according to claim 4, further comprising:
a condensing member for condensing said light of said light source relative to said line sensor.

6. A lens device according to claim 5, wherein said condensing member is a condenser lens.

7. A lens device according to claim 6, further comprising:
a cover for containing said light source and said condenser lens.

8. A lens device comprising:
a lens frame for holding a lens;
a shaft member disposed in parallel to an optical axis of said lens;
a driving device for applying a driving force to said shaft member to move said lens frame in a direction of said optical axis;
a connector for connecting said shaft member and said lens frame to transmit said driving force to said lens frame;
a guide member disposed in parallel to said optical axis to guide said lens frame moving in the direction of the optical axis;
a first detection member disposed at a lateral side of said lens frame so as to separate from said connector by a substantially right angle around said optical axis;
a second detection member confronting said first detection member and disposed in the direction of said optical axis, one of said first and second detection members detecting the other thereof;
a lens-position controller for obtaining positional information of said lens on the basis of a detection signal outputted by detecting one of said first and second detection members with the other thereof;
an original-position detector for judging whether or not said positional information of said lens corresponds to a preset original position of said lens, said original-position detector judging said positional information before said lens frame is moved to a target position,
wherein said lens frame is moved to said target position after being moved to said original position when said original-position detector judges that said positional information of said lens does not correspond to said original position,
wherein said first detection member is a photoelectronic sensor of either of a transmission type and a reflection type, said photoelectronic sensor having a light emitter for emitting light and a light receiver for receiving the light of said light emitter, and said second detection member is an encode plate in which slits are formed in the direction of said optical axis at predetermined intervals,
wherein said lens-position controller obtains said positional information of said lens on the basis of a detection signal, which is outputted at a time when said light receiver receives the light of said light emitter, and a drive signal for actuating said driving device.

9. A lens device according to claim 8, wherein said photoelectronic sensor of the transmission type detects the light having passed through said slit, and said photoelectronic sensor of the reflection type detects the light reflected by a detection surface residing between said slits.

10. A lens device comprising
a lens frame for holding a lens;
a shaft member disposed in parallel to an optical axis of said lens;
a driving device for applying a driving force to said shaft member to move said lens frame in a direction of said optical axis;
a connector for connecting said shaft member and said lens frame to transmit said driving force to said lens frame;
a guide member disposed in parallel to said optical axis to guide said lens frame moving in the direction of the optical axis;
a first detection member disposed at a lateral side of said lens frame so as to separate from said connector by a substantially right angle around said optical axis;

a second detection member confronting said first detection member and disposed in the direction of said optical axis, one of said first and second detection members detecting the other thereof; and a lens-position controller for obtaining positional information of said lens on the basis of a detection signal outputted by detecting one of said first and second detection members with the other thereof, wherein said first detection member is a magnetic sensor, and said second detection member is a magnetic material having intensity distribution of magnetic fields continuously changing in the direction of said optical axis, wherein said magnetic material is a magnetic tape, and a lower portion of a diagonal line of said magnetic tape is magnetized.

11. A lens device comprising:

a lens frame for holding a lens;

a shaft member disposed in parallel to an optical axis of said lens;

a driving device for applying a driving force to said shaft member to move said lens frame in a direction of said optical axis;

a connector for connecting said shaft member and said lens frame to transmit said driving force to said lens frame;

a guide member disposed in parallel to said optical axis to guide said lens frame moving in the direction of the optical axis;

a first detection member disposed at a lateral side of said lens frame so as to separate from said connector by a substantially right angle around said optical axis;

a second detection member confronting said first detection member and disposed in the direction of said optical axis, one of said first and second detection members detecting the other thereof; and a lens-position controller for obtaining positional information of said lens on the basis of a detection signal outputted by detecting one of said first and second detection members with the other thereof, wherein said first detection member is a conductive slider, and said second detection member is a substrate having a conductive pattern, which is disposed in the direction of said optical axis and on which said slider slides;

wherein said conductive slider and said substrate are physically in contact with each other when said slider slides.

12. A lens device according to claim 11, wherein said slider is made of an urging member, and said lens frame is pressed against said guide member by an urging force of said slider when said slider abuts on said pattern.

13. A lens device according to claim 12, wherein one end of said slider slides on said pattern, and the other end of said slider is fixed to an attachment base disposed on said lens frame.

14. An imaging device for taking a subject, said imaging device including a solid-state image sensor, which converts an image of said subject into an image signal to output this image signal, and a lens device for forming the image of said subject, said lens device comprising:

a lens frame for holding a lens;

a shaft member disposed in parallel to an optical axis of said lens;

a driving device for applying a driving force to said shaft member to move said lens frame in a direction of said optical axis;

a connector for connecting said shaft member and said lens frame to transmit said driving force to said lens frame;

a guide member disposed in parallel to said optical axis to guide said lens frame moving in the direction of the optical axis;

a first detection member disposed at a lateral side of said lens frame so as to separate from said connector by a substantially right angle around said optical axis;

a second detection member confronting said first detection member and disposed in the direction of said optical axis, one of said first and second detection members detecting the other thereof;

a lens-position controller for obtaining positional information of said lens on the basis of a detection signal outputted by detecting one of said first and second detection members with the other thereof;

wherein said first detection member is least one of a light source for emitting light and conductive slider, and said second detection member is correspondingly at least one of a line sensor for detecting said light and substrate having a conductive pattern, which is disposed in the direction of said optical axis and on which said slider slides.

15. An imaging device according to claim 14, wherein said solid-state image sensor is a CCD image sensor.

* * * * *